(12) United States Patent
Du

(10) Patent No.: US 12,449,566 B2
(45) Date of Patent: Oct. 21, 2025

(54) FRONT BLIND ZONE PERSPECTIVE VIRTUAL DISPLAY DEVICE BASED ON CONVEX LENS/CONCAVE LENS AND METHOD

(71) Applicant: Jiajia Du, Tongling (CN)

(72) Inventor: Jiajia Du, Tongling (CN)

( * ) Notice: Subject to any disclaimer, the term of this patent is extended or adjusted under 35 U.S.C. 154(b) by 444 days.

(21) Appl. No.: 18/015,093

(22) PCT Filed: Jul. 7, 2021

(86) PCT No.: PCT/CN2021/104910
§ 371 (c)(1),
(2) Date: Jan. 9, 2023

(87) PCT Pub. No.: WO2022/007826
PCT Pub. Date: Jan. 13, 2022

(65) Prior Publication Data
US 2023/0251402 A1 Aug. 10, 2023

(30) Foreign Application Priority Data

Jul. 8, 2020 (CN) .......................... 202010649576.6

(51) Int. Cl.
*G02B 3/00* (2006.01)
*B60R 1/24* (2022.01)
(Continued)

(52) U.S. Cl.
CPC ................. *G02B 3/00* (2013.01); *B60R 1/24* (2022.01); *G02B 7/02* (2013.01); *B60R 2300/205* (2013.01); *G02B 17/08* (2013.01)

(58) Field of Classification Search
CPC .. G02B 3/00; G02B 7/02; G02B 17/08; B60R 1/24; B60R 2300/205
(Continued)

(56) References Cited

U.S. PATENT DOCUMENTS

| | | | | |
|---|---|---|---|---|
| 2011/0199198 A1* | 8/2011 | Yang | ......................... | B60R 1/24 |
| | | | | 340/426.25 |
| 2021/0268961 A1* | 9/2021 | Asami | ....................... | B60R 1/24 |
| 2021/0323484 A1* | 10/2021 | Jeong | ................. | B60R 11/0235 |

FOREIGN PATENT DOCUMENTS

| | | | |
|---|---|---|---|
| CN | 103135233 A | * | 6/2013 |
| CN | 103135233 Y | | 6/2013 |

(Continued)

*Primary Examiner* — Stephone B Allen
(74) *Attorney, Agent, or Firm* — Hemisphere Law, PLLC; Zhigang Ma

(57) ABSTRACT

Provided is a front blind zone perspective virtual display device based on a convex lens/concave lens, and a method. The front blind zone perspective virtual display device includes a convex lens/concave lens, at least one image display and a container, wherein the image display is located within a once focal length at a ray output side of the convex lens/concave lens and configured to display a to-be-imaged target image, and the container contains the convex lens/concave lens and the image display and makes room for an imaging optical path of the convex lens/concave lens and the image display. The present disclosure has the following beneficial effects: the perspective virtual image displayed on the perspective virtual display device is integrally blended with a front road condition, so a driver can observe the front road condition and a perspective screen at the same time without needing to transfer a sight and adjust a sighting distance, and the observation is intuitive and comfort; and while various kinds of information required by driving are obtained in a more timely and convenient manner, the eye fatigue of the driver can be also alleviated, and the driving safety is further improved.

10 Claims, 7 Drawing Sheets

(51) Int. Cl.
 *G02B 7/02* (2021.01)
 *G02B 17/08* (2006.01)
(58) Field of Classification Search
 USPC .......................................................... 359/738
 See application file for complete search history.

(56) References Cited

FOREIGN PATENT DOCUMENTS

| | | | | |
|---|---|---|---|---|
| CN | 103358996 | A | 10/2013 | |
| CN | 108089336 | Y | 5/2018 | |
| CN | 108375830 | A | 8/2018 | |
| CN | 111781727 | | 10/2020 | |
| JP | 2010188897 | A | 9/2010 | |
| JP | 2014228314 | A * | 12/2014 | ......... G11C 13/0069 |
| JP | 2014228314 | Y | 12/2014 | |
| WO | 2020009218 | A | 1/2020 | |

* cited by examiner

FRONT BLIND ZONE PERSPECTIVE VIRTUAL DISPLAY DEVICE BASED ON CONVEX LENS/CONCAVE LENS AND METHOD

TECHNICAL FIELD

The present discloses relates to a perspective virtual display device, in particular to a front blind zone perspective virtual display device and a using method.

BACKGROUND

When driving a vehicle, a driver needs to have an ability of observing and perceiving the vehicle and its surrounding, so as to accurately judge the size, shape, position, direction, speed and driving trajectory of the driven vehicle as well as the type, quantity, distance of a surrounding obstacle and other information, and the driver can operate the vehicle accurately and timely so that the vehicle can drive normally. At present, cabs of most of vehicles have some observation blind zones.

Taking a car as an example, the car cab has a plurality of blind zones, such as a front blind zone, a back blind zone, a rear-view mirror blind zone and an AB column blind zone, which limit the driver's ability of observing and perceiving the surroundings, so that the driver cannot accurately judge the situation in the blind zone and the position of the car body in the blind zone. At the same time, the driver cannot accurately and intuitively judge her/his left and right vehicle width, front position, driving trajectory and other relevant information, resulting in a certain trouble to the driving and existing a certain driving safety hazard. At present, some blind zone visualization devices basically adopt camera shooting devices to collect video images at corresponding blind zone positions, and in a planar or 3D manner, the video images are displayed on a screen in the cab and provided to the driver for viewing in a shorter sighting distance. The driver needs to transfer the sight and adjust the sighting distance when viewing the video images, so this viewing mode is not intuitive or convenient, and when observing the screen, the driver' slight will be away from the road conditions ahead, so there are safety hazards in high-speed driving.

Chinese utility model patent No. CN204605659U discloses a video display device applied and coated on columns A and C of a car cab to eliminate a blind zone. A flexible display screen is designed to a display device applied and coated on inner surfaces of the columns A and C of the car cab according to the column characteristics of the columns A and C of the car cab and using a special-shaped display technology, each display device is equipped with a miniature infrared HD camera lens at a corresponding position outside the car body, the miniature infrared HD camera lens and a display screen in the car constitute a group of relatively independent video real-time display units, each independent unit forms a whole set of video real-time display device to eliminate the blind zones of the columns A and C in the car cab, and the device displays the real-time video directly by using the flexible display screen, and with a shorter sighting distance, the device is not suitable for displaying the road conditions of the front blind zone. For another example, Chinese invention patent No. CN107662542A discloses a head-up display device capable of perceiving road conditions under a low visibility condition, the head-up display device includes an optical projection device, a binocular parallax prism, a first reflector, a second reflector, an infrared camera, an automobile windshield and an automatic dimming circuit board, and the optical projection device is composed of a reflector bow, a tri-phosphor LED light, a first biconvex lens, an electric fan, a power control circuit board, a first Fresnel lens, a liquid crystal display screen, a second Fresnel lens, a right-angle total reflection prism, a second biconvex lens, a biconcave lens, a third biconvex lens and a metal aluminum box. Its structure is complex, and the production and maintenance costs are very high.

SUMMARY

The purpose of the present disclosure is to provide a cab blind zone perspective virtual display device based on a convex lens/concave lens imaging law, so as to help a driver observe road conditions outside a car body located in the blind zone, a width of the car body on a pavement, a position of the car body on the pavement, a front position, a vehicle driving trajectory and other information related to the driving through the car body, and the driver may accurately operate the vehicle according to the related information observed through the perspective virtual display device, thereby improving the driving safety.

The technical solution of the present disclosure is as follows: a front blind zone perspective virtual display device based on a convex lens/concave lens includes a convex lens/concave lens, at least one image display and a container; the image display is located within a once focal length at a ray output side of the convex lens/concave lens and configured to display a to-be-imaged target image, and a virtual image formed by the image display through the convex lens/concave lens is projected into a front blind zone and blended with the to-be-imaged target; and the container contains the convex lens/concave lens and the image display and makes room for an imaging optical path of the convex lens/concave lens and the image display.

The above solution includes the convex lens, one image display and the container; and the container contains the convex lens and the image display and makes room for the imaging optical path of the convex lens and the image display.

The above solution includes the convex lens, a first image display, a second image display and the container; the first image display and the second image display are distributed at intervals, the first image display is closed to the convex lens and a transparent material, and the second image display is away from the convex lens; and the container contains the convex lens and the image display and makes room for the imaging optical path of the convex lens and the image display.

The above solution includes the concave lens, one image display and the container; and the container contains the concave lens and the image display and makes room for the imaging optical path of the concave lens and the image display.

The above solution includes the concave lens, the first image display, the second image display and the container; the first image display and the second image display are distributed at a concave side of the concave lens at intervals, the first image display is closed to the concave lens and a transparent material, and the second image display is away from the concave lens; and the container contains the concave lens and the image display and makes room for the imaging optical path of the concave lens and the image display.

The improvement of the above solution is that a sun visor capable of preventing an upper ray entering the container is disposed above the convex lens/concave lens.

The further improvement of the above solution is that a semi-transparent and/or semi-reflection plate capable of reducing an external ray to enter the convex lens/concave lens is disposed at a ray entry side of the convex lens/concave lens.

In the above solution, the convex lens is a plano-convex lens, a biconvex lens or a Fresnel lens.

In the above solution, a display brightness of the image display is adjustable.

A using method for a front blind zone perspective virtual display device based on a convex lens/concave lens includes the following steps of: placing the front blind zone perspective virtual display device below a cab front windshield, the image display collecting the image of the front blind zone in real time and forming a to-be-projected image after treatment, human eyes observing the virtual image of the to-be-project image displayed in the front blind zone through the convex lens/concave lens, completely blending this virtual image with the actual image of the front blind zone, so that the driver observing the situation of the front blind zone through the front without needing to switch the sight.

The present disclosure has the following beneficial effects: the perspective virtual image displayed on the perspective virtual display device is integrally blended with the front road condition, so the driver can observe the front road condition and the perspective screen at the same time without needing to transfer the sight and adjust the sighting distance, and the observation is intuitive and comfort; and while various kinds of information required by driving are obtained in a more timely and convenient manner, the eye fatigue of the driver can be also alleviated, and the driving safety is further improved.

Figure 1:
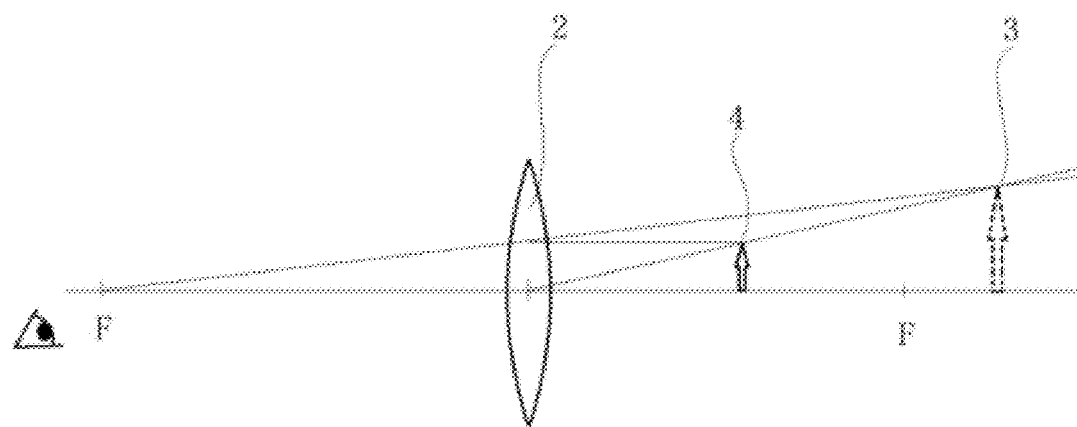
FIG. 1 is a schematic diagram of a convex lens imaging law.

In the drawing: 1. Container, 2. Lens body, 3. Virtual image, 4. Object, 5. Second image display, 6. Second virtual image, 7. First image display, 8. First virtual image, 9. Second physical surface, 10. First physical surface, 11. Dark semi-transparent and/or semi-reflection plate, 12. Non-transparent sun visor, 13. Mirror reflection plate, 14. Semi-transparent and semi-reflection mirror plate, 15. Front blind zone, 16. Pavement lane line, 17. Virtual image of the pavement lane line in perspective display in the first virtual image, 18. Display image of the pavement lane line collected and processed in the first image display, 19. Virtual image of virtual wheel driving trajectory in overlapping display in the first virtual image, 20. Display image of the virtual wheel driving trajectory processed and overlapped in the first image display, 21. Virtual image of virtual navigation information in overlapping display in the first virtual image, 22. Display image of the virtual navigation information overlapped in the first image display, 23. Virtual image of left headlight position in virtual indication in the second virtual image, 24. Display image of left headlight position in virtual indication in the second image display, 25. Virtual image of vehicle brand mark at front middle position in virtual indication in the second virtual image, 26. Display image of vehicle speed information in virtual indication in the second image display, 27. Virtual image of vehicle speed information in virtual indication in the second virtual image, 28. Display image of vehicle brand mark at front middle position in virtual indication in the second image display, 29. Image displayed on the second image display, 30. Image displayed on the first image display, F. Focal length.

DETAILED DESCRIPTION OF THE EMBODIMENTS

The technical solution in the embodiments of the present disclosure will be described clearly and completely below in combination with the drawings. It is apparent that the described embodiments are only a part of the embodiments of the present disclosure but not all. Based on the embodiments of the present disclosure, all the other embodiments obtained by those of ordinary skill in the art on the premise of not contributing creative effort should belong to the protection scope of the present disclosure.

Based on the convex lens/concave lens imaging law and in the lens body, the image displayed on the image display forms the virtual image that is completely consistent and coincided with the size, shape, position, angle, distance, direction, color, brightness and other parameters of an object needing to be observed through perspective or an object needing virtual display.

According to the shape of the object needing to be observed through perspective or the object needing virtual display, the image display may include but be not limited to point, linear, planar and solid display devices, and may display the planar and/or solid image; and the displayed image may be a static image and/or a dynamic image.

The convex lens includes but is not limited to a plano-convex lens, a biconvex lens, a Fresnel lens, etc.

The image display may be a transparent and/or non-transparent display.

The display brightness of the image display may be adjusted in real time according to the intensity of the environment ray, so that the image display always keeps the display brightness that is most conducive to the driver's observation.

The quantity of the image display may be one or more, and the plurality of image displays may form a plurality of virtual images with different positions and distances at the same time.

Through the mirror reflection material and/or the mirror semi-reflection and semi-transmission material, the optical path of this device performs multiple reflections, so as to change the device shape and/or reduce the device volume.

This device may, adopting the mirror semi-reflection and semi-transmission material, integrate a plurality of groups of image displays with different distances and positions to a group of optical path, so as to display multi-layered virtual images with different distances and positions.

The virtual and/or overlapping display of this device at a corresponding position required may include but not be limited to a corresponding object, a driving trajectory, an instrument panel parameter, a front-view and/or rear-view image, a reversing image, map navigation, communication information and various information related to the driving and the driver.

A dark semi-transparent and/or semi-reflection plate may be disposed at the front of the lens body, so as to reduce the reflection generated by an external ray entering the lens body, and improve the display quality of the device.

A non-transparent sun visor may be disposed above the front of the lens body, so as to block the above ray to enter the display device and prevent an incident ray from causing lens body reflection and affecting the display quality of the device.

Figure 2:
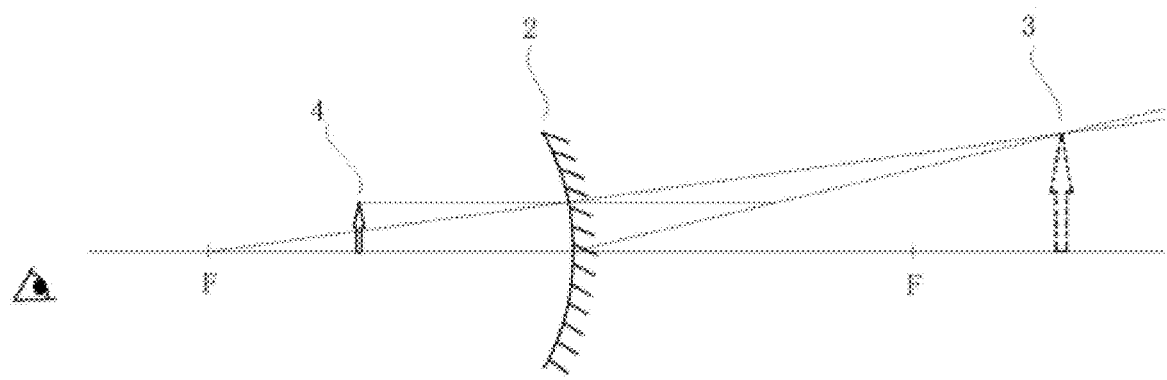
FIG. 2 is a schematic diagram of a concave lens imaging law.

According to the schematic diagram of the convex lens/concave lens imaging law as shown in FIG. 1 and FIG. 2, the object 4 disposed within a once focal length of the lens body forms a magnified virtual image 3 in an equal proportion with an image distance/object distance at the position of the image distance farther than the object distance based on the convex lens/concave lens imaging law, and the image distance position of each point on the virtual image 3 corresponds to the object distance position of the corresponding point on the object 4. If it needs to obtain the virtual image (the virtual image 3) of the object with the same size and distance as the virtual image 3, based on the convex lens/concave lens imaging law, each point on the virtual image 3 that is completely coincided with the size and distance of the object corresponds to the corresponding position within the once focal length of the lens body, and all corresponding points are gathered and completely coincided with the object 4. The image display is disposed at the position of the object 4, the image displayed on the image display is exactly the same as the dimension, size and shape of the object 4, and the virtual image that is exactly the same as the dimension, size and shape of the virtual image 3 is formed at the position of the virtual image 3.

Figure 3:
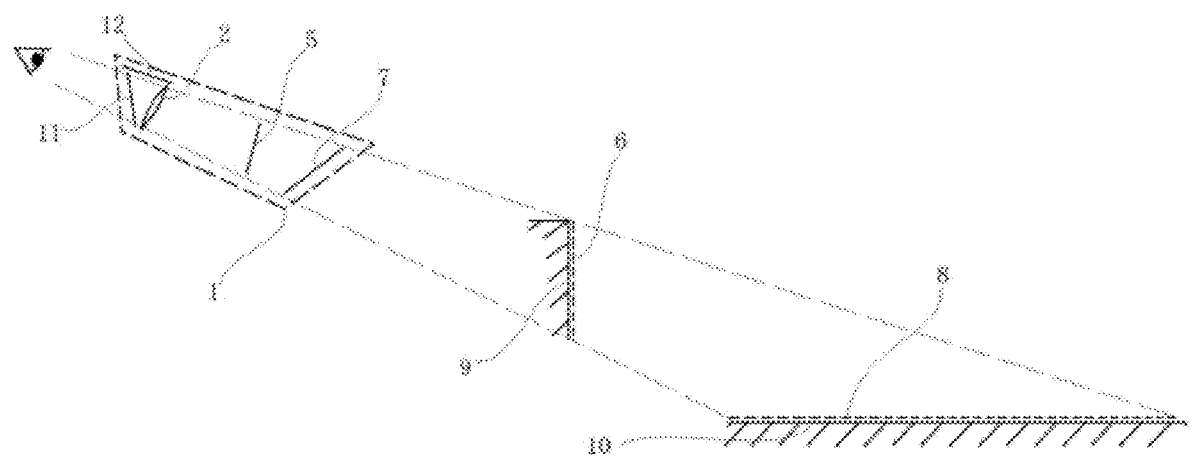
FIG. 3 is a structure schematic diagram of a convex lens perspective virtual display device.

FIG. 3 is a structure schematic diagram of a convex lens perspective container 1. In this example, the perspective container 1 is composed of a convex lens body 2, a first image display 7 and a second image display 5, and an observer, the convex lens body 2, the second image display 5, the first image display 7, a physical surface 9 and a physical surface 10 constitute an optical path. Hem, the second image display 5 is a transparent image display, so that the sight may observe the first image display 7 through the second image display 5, and the first image display 7 may be a transparent image display or a non-transparent image display. To first image display 7 may form a first virtual image 8, which is completely coincided with the first physical surface 10, and the second image display 5 may form a second virtual image 6, which is completely coincided with the second physical surface 9. The sight penetrates through the perspective container 1 to observe the second virtual image 6 completely coincided with the second physical surface 9 and the first virtual image 8 completely coincided with the first physical surface 10 through the second physical surface 9, so as to achieve the perspective effect that the sight observes the second physical surface 9 and the first physical surface 10 through an obstacle. The perspective container 1 is provided with a non-transparent sun visor 12 above the front of the lens body 2, so as to block the above ray to enter the display device and prevent the incident ray from causing lens body reflection and affecting the display quality of the device. The dark semi-transparent and/or semi-reflection plate 11 is disposed at the front of the convex lens body 2, so as to reduce the reflection generated by the external ray entering the lens body, and improve the display quality of the device.

Figure 4:
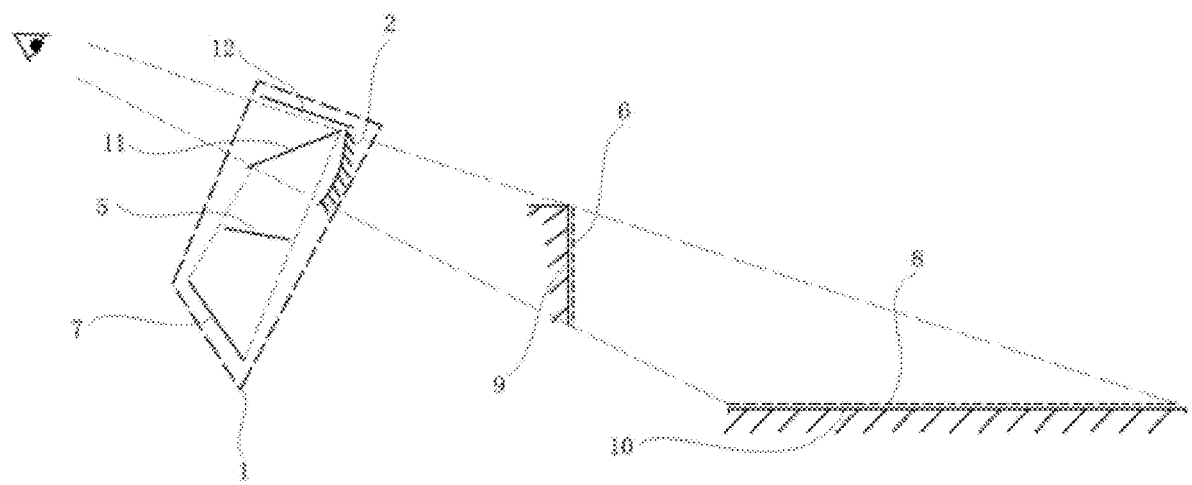
FIG. 4 is a structure schematic diagram of a concave lens perspective virtual display device.

FIG. 4 is a structure schematic diagram of a concave lens perspective container 1. In this example, the perspective container 1 is composed of a concave lens body 2, a first image display 7 and a second image display 5, and an observer, the concave lens body 2, a physical surface 9 and a physical surface 10 constitute an optical path. Due to the concave lens imaging law, the first image display 7 and the second image display 5 cannot be displaced between the observer and the concave lens body 2, and therefore the first image display 7 and the second image display 5 are biased outside the optical path. Here, the second image display 5 is a transparent image display, so that the sight may observe the first image display 7 through the second image display 5, and the first image display 7 may be a transparent image display or a non-transparent image display. The first image display 7 may form a first virtual image 8, which is completely coincided with the first physical surface 10, and the second image display 5 may form a second virtual image 6, which is completely coincided with the second physical surface 9. The sight penetrates through the perspective container 1 to observe the second virtual image 6 completely coincided with the second physical surface 9 and the first virtual image 8 completely coincided with the first physical surface 10 through the second physical surface 9, so as to achieve the perspective effect that the sight observes the second physical surface 9 and the first physical surface 10 through an obstacle. The perspective container 1 is provided with the non-transparent sun visor 12 above the front of the concave lens body 2, so as to block the above ray to enter the display device and prevent the incident ray from causing lens body reflection and affecting the display quality of the device. The dark semi-transparent and/or semi-reflection plate 11 is disposed at the front of the concave lens body 2, so as to reduce the reflection generated by the external ray entering the lens body, and improve the display quality of the device.

Figure 5:
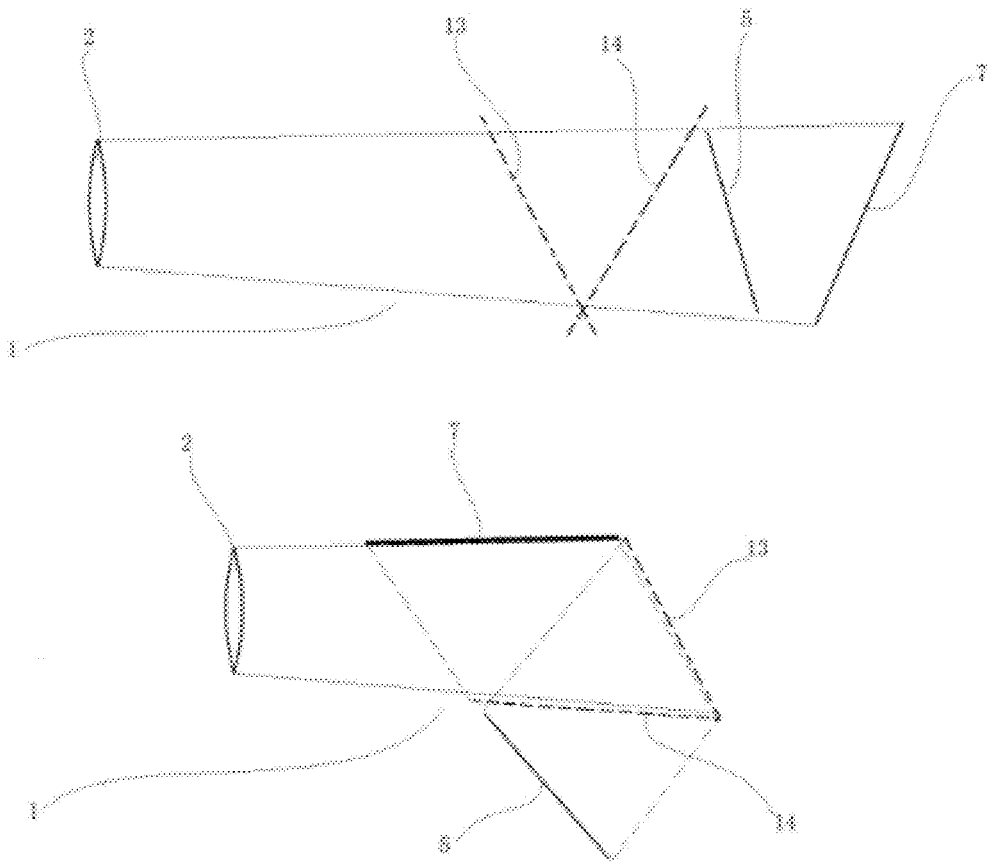
FIG. 5 is a reflection and folding schematic diagram of an optical structure of a perspective virtual display device.

FIG. 5 is a reflection and folding schematic diagram of an optical structure of a perspective container 1. Taking a convex lens body 2 as an example, the upper figure of FIG. 5 illustrates a typical optical path structure of the perspective container 1, and the perspective container 1 is composed of the lens body 2, a first image display 7 and a second image display 5. In order to change the shape and/or reduce the device volume for easy installation, a mirror reflection plate 13 and a semi-transparent and semi-reflection mirror plate 14 are disposed, and after the optical path of the perspective container 1 is reflected and folded through the mirror reflection plate 13 and the semi-transparent and semi-reflection mirror plate 14, the structure of the perspective container 1 as shown in the lower figure of FIG. 5 is formed, so that the shape of the perspective container 1 is changed and the volume is reduced; and the second image display 5 is integrated in the optical path through the semi-transparent and semi-reflection mirror plate 14.

Figure 6:
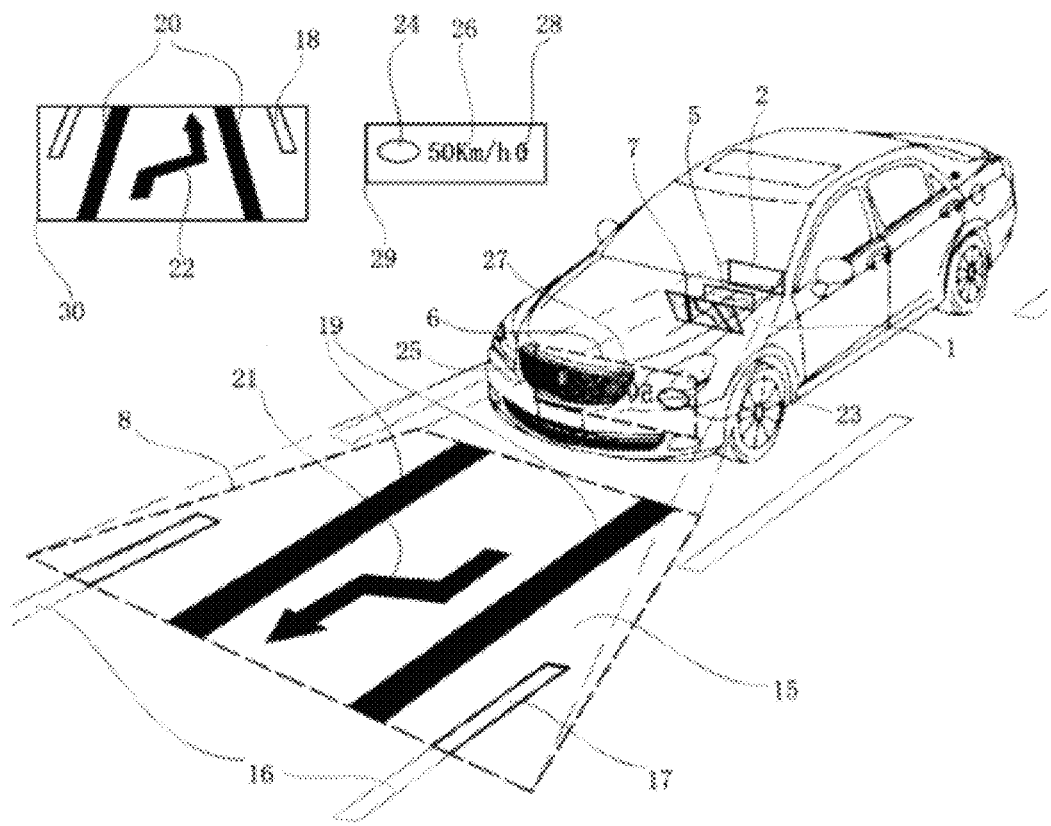
FIG. 6 is a schematic diagram of an automobile application of a perspective virtual display device.

FIG. 6 is a schematic diagram of an automobile application of a perspective container 1, and in this example, the perspective container 1 is composed of a convex lens body 2, a first image display 7 and a second image display 5. According to the dimension, size and distance of a front blind zone 15 as well as the collected image of the front blind zone 15, the first image display 7 forms the image 30 displayed on the first image display and a first virtual image 8. The dimension, size, distance and position of the first virtual image 8 are completely coincided with the image of the front blind zone 15 and horizontal. According to the collected image of the front blind zone 15, the image 30 displayed on the first image display displays a display image 18 of a pavement lane line collected and processed in the first image display, and the display image 18 of the pavement lane line collected and processed in the first image display correspondingly forms a virtual image 17 of the pavement lane line in perspective display in the first virtual image. The virtual image 17 of the pavement lane line in perspective display in the first virtual image is completely coincided with the pavement lane line 16. In a virtual overlapping manner, the image 30 displayed on the first image display also displays a display image 20 of a virtual wheel driving trajectory processed and overlapped in the first image display and a display image 22 of virtual navigation information overlapped in the first image display. The display image 20 of the virtual wheel driving trajectory processed and overlapped in the first image display and the display image 22 of the virtual navigation information overlapped in the first image display correspondingly form a virtual image 19 of the virtual wheel driving trajectory overlapped and displayed in the first virtual image and a virtual image 21 of the virtual navigation information overlapped and displayed in the first virtual image in respective, and the virtual image 19 of the virtual wheel driving trajectory overlapped and displayed in the first virtual image is completely coincided with the actual driving trajectory of the vehicle. According to a front distance, a position of an automobile brand mark and a position of a left headlamp, the second image display 5 forms an image 29 displayed on the second image display and forms a second virtual image 6 that is completely coincided and vertical to the front at the front position. A display image 24 of the left headlamp position in virtual indication in the second image display and a display image 28 of the vehicle brand mark at a front middle position in virtual indication in the second image display are in virtual overlapping on the image 29 displayed on the second image display, respectively corresponding to a virtual image 23 of the left headlamp position in virtual indication in the second virtual image approximately coincided with the left headlamp position and a virtual image 25 of the vehicle brand mark at the front middle position in virtual indication in the second virtual image coincided with the position of the vehicle brand mark. The image 29 displayed on the second image display also overlaps and displays the display image 26 of the vehicle speed information in virtual indication in the second image display, and correspondingly, the second virtual image 6 at the headlamp position forms a virtual image 27 of the vehicle speed information in virtual indication in the second virtual image.

Figure 7:
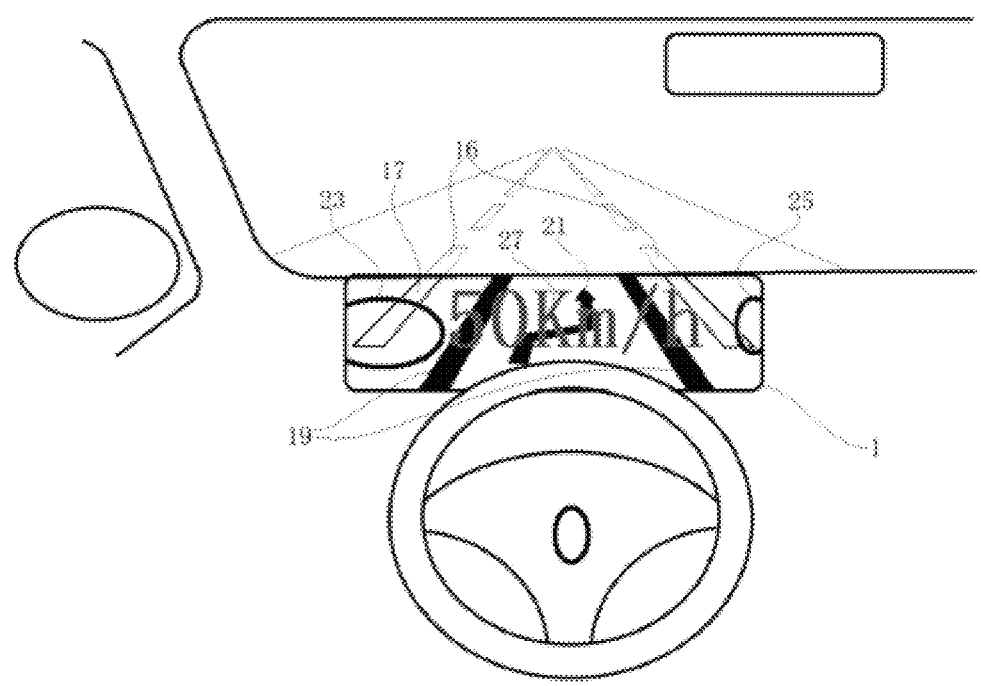
FIG. 7 is a schematic diagram of an automobile application of a perspective virtual display device in a driver perspective.

FIG. 7 is a schematic diagram of an automobile application of a perspective container 1 in a driver perspective. When sitting in the cab, through the perspective container 1, the driver can observe the virtual image 23 at the left headlamp position in virtual indication in the second virtual image located at the front left headlamp position, the virtual image 25 of the vehicle brand mark at the front middle position in virtual indication in the second virtual image located at the front middle brand mark position and the virtual image 27 of the vehicle speed information in virtual indication in the second virtual image located at the front position. When acquiring the vehicle information, the driver can also judge the position distance of the left front corner of the front and the distance of the front middle position with the help of relevant information. The driver can also observe the real-time image fitting with the pavement in the blind zone through the perspective container 1, such as the virtual image 17 of the pavement lane line in perspective display in the first virtual image. The virtual image 17 of the pavement lane line in perspective display in the first virtual image is completely coincided with the pavement lane line 16. Through the perspective container 1, the driver can also observe the virtual image 21 of the virtual navigation information overlapped and displayed in the first virtual image overlapped and displayed on the pavement in the blind zone and the virtual image 19 of the virtual wheel driving trajectory overlapped and displayed in the first virtual image. The virtual image 19 of the virtual wheel driving trajectory overlapped and displayed in the first virtual image is completely coincided with the actual driving trajectory of the vehicle. When acquiring the corresponding navigation information, with the help of the virtual image 19 of the virtual wheel driving trajectory overlapped and displayed in the first virtual image, the driver can judge the left and right width and the relative position of the vehicle driving on the pavement as well as the trajectory of the vehicle to drive, so that the driver can control the vehicle well, and the driving safety is improved. At the same time, since the perspective image displayed on the perspective container 1 is integrated with the front road condition, the driver can observe the front road condition and the perspective screen at the same time without needing to transfer the sight and adjust the sighting distance, and the observation is intuitive and comfort. While various kinds of information required by driving are obtained in a more timely and convenient manner, the eye fatigue of the driver can be also alleviated, and the driving safety is further improved.

It is noted that the front blind zone perspective virtual display device based on the convex lens/concave lens provided by the present disclosure not only can be used to display the front blind zone, but also can be used to display the rear blind zone, and the principle is the same as above.

In the present disclosure, the image display collects the road condition outside the car body in the blind zone, the width of the car body on the pavement, the position of the car body on the pavement, the front position, the vehicle driving trajectory and various information related to driving. Specifically, these information can be collected through the camera, and then the image of a real scene scaled down in an equal proportion is displayed on the image display according to the convex lens/concave lens imaging law, finally after scaling up in the same proportion through the convex lens/concave lens, the image of the real scene scaled down in the equal proportion is reduced to the virtual image consistent with the real scene. The virtual image is blended with the real scene, this information collection and processing may be implemented in the prior art, and reflected in Chinese utility model patent No. CN206765921U, an external image collected, processed and displayed through an optoelectronic device, Chinese invention patent No. CN201010590428.8, a camera input module, an image correction module and an image display module for a panoramic parking assist system, and Chinese invention patent No. CN107662542A.

Of course, the present disclosure may also use one image display to form one virtual image. Specifically, the image display may be a tablet computer, a liquid crystal display and other devices with light sources, which can display the processed image. The container may be a transparent box body, or at least partially transparent box body, and due to the transparent part, the optical path part among the observer, the convex lens/concave lens, the first image display 7 and/or the second image display 5 is unhindered.

What is claimed is:

1. A front blind zone perspective virtual display device based on a convex lens/concave lens, comprising a convex lens/concave lens, at least one image display, and a container containing the convex lens/concave lens and the at least one image display, wherein the at least one image display is located within a once focal length at a ray output side of the convex lens/concave lens and configured to display an image of a to-be-imaged target, and a virtual image formed by the at least one image display through the convex lens/concave lens is projected into a front blind zone and coincided with the front blind zone.

2. The front blind zone perspective virtual display device based on the convex lens/concave lens according to claim 1, the convex lens/concave lens is convex lens, and the at least one image display comprises one image display.

3. The front blind zone perspective virtual display device based on the convex lens/concave lens according to claim 1, the convex lens/concave lens is convex lens, and the at least one image display comprises a first image display, and a second image display, the first image display and the second image display are distributed at intervals, the first image display is closer to the convex lens and comprises a transparent material, and the second image display is farther away from the convex lens.

4. The front blind zone perspective virtual display device based on the convex lens/concave lens according to claim 1, the convex lens/concave lens is concave lens, and the at least one image display comprises one image display.

5. The front blind zone perspective virtual display device based on the convex lens/concave lens according to claim 1, the convex lens/concave lens is concave lens, and the at least one image display comprises a first image display, and a second image display, the first image display and the second image display are distributed at a concave side of the concave lens at intervals, the first image display is closer to the concave lens and comprises a transparent material, and the second image display is farther away from the concave lens.

6. The front blind zone perspective virtual display device based on the convex lens/concave lens according to claim 1, wherein a sun visor capable of preventing an upper ray entering the container is disposed above the convex lens/concave lens.

7. The front blind zone perspective virtual display device based on the convex lens/concave lens according to claim 1, wherein a semi-transparent and/or semi-reflection plate capable of reducing an external ray to enter the convex lens/concave lens is disposed at a ray entry side of the convex lens/concave lens.

8. The front blind zone perspective virtual display device based on the convex lens/concave lens according to claim 2, wherein the convex lens is a plano-convex lens, a biconvex lens or a Fresnel lens.

9. The front blind zone perspective virtual display device based on the convex lens/concave lens according to claim 1, wherein a display brightness of the at least one image display is adjustable.

10. A using method for a front blind zone perspective virtual display device based on a convex lens/concave lens according to claim 1, wherein the method comprises the following steps of: placing the front blind zone perspective virtual display device below a cab front windshield, the at least one image display collecting an image of the front blind zone in real time and forming a to-be-projected image after treatment, human eyes observing the virtual image of the to-be-projected image displayed in the front blind zone through the convex lens/concave lens, the virtual image is coincided with the front blind zone, so that the driver being capable of observing a situation of the front blind zone through the front without needing to switch the sight.

* * * * *